(12) United States Patent
Miyauchi et al.

(10) Patent No.: US 8,189,288 B2
(45) Date of Patent: May 29, 2012

(54) ROTOR HUB, SPINDLE MOTOR AND HARD DISK DRIVE

(75) Inventors: Toshiaki Miyauchi, Ono (JP); Yasuo Yamamoto, Asago (JP)

(73) Assignees: Nidec Corporation, Kyoto (JP); Tokusen Kogyo Co., Ltd., Hyogo (JP)

( * ) Notice: Subject to any disclaimer, the term of this patent is extended or adjusted under 35 U.S.C. 154(b) by 799 days.

(21) Appl. No.: 12/256,597

(22) Filed: Oct. 23, 2008

(65) Prior Publication Data

US 2009/0103207 A1 Apr. 23, 2009

(30) Foreign Application Priority Data

Oct. 23, 2007 (JP) ................. 2007-275767

(51) Int. Cl.
*G11B 17/08* (2006.01)
*G11B 17/02* (2006.01)

(52) U.S. Cl. .............. 360/98.08; 360/99.08; 384/107

(58) Field of Classification Search .......... 360/99.08, 360/98.08; 384/107
See application file for complete search history.

(56) References Cited

U.S. PATENT DOCUMENTS

| 4,334,006 A | * | 6/1982 | Kitajima et al. ............ 430/254 |
| 5,174,025 A | | 12/1992 | Tasaki et al. |
| 6,059,378 A | * | 5/2000 | Dougherty et al. ........ 301/124.1 |
| 2004/0145260 A1 | * | 7/2004 | Tamaoka et al. ................ 310/90 |
| 2006/0171614 A1 | * | 8/2006 | Kashiwa et al. .............. 384/100 |

FOREIGN PATENT DOCUMENTS

| JP | 408335379 A | * | 12/1996 |
| JP | 3135553 | | 12/2000 |
| JP | 2001-131711 | | 5/2001 |
| JP | 2003-285228 | | 10/2003 |
| JP | 2005-205499 | | 8/2005 |

* cited by examiner

*Primary Examiner* — Hoai V Ho
*Assistant Examiner* — Min Huang
(74) *Attorney, Agent, or Firm* — Keating & Bennett, LLP

(57) ABSTRACT

In a method for manufacturing a rotor hub for use in a spindle motor, free-cutting stainless steel is used as a material of the rotor hub. A slug of free-cutting stainless steel is subjected to a plastic working to form a disk mounting portion and a cylindrical surface positioned radially inwardly of the disk mounting portion. Then, a cylindrical disk fitting surface is formed by machining substantially the entirety of the cylindrical surface. The rotor hub contains A-type inclusions appearing in a cross section taken along a center axis of the disk mounting portion. The A-type inclusions are oriented in directions different than the center axis.

22 Claims, 13 Drawing Sheets 60b    60a

ROTOR HUB, SPINDLE MOTOR AND HARD DISK DRIVE

FIELD OF THE INVENTION

The present invention relates to a spindle motor for use in a hard disk drive and, more particularly, to a rotor hub, one of major parts of the spindle motor.

BACKGROUND OF THE INVENTION

A hard disk drive was originally developed as a storage device of a computer. In recent years, however, the hard disk drive is extensively employed not only in the computer but also in home electric appliances such as a video recorder, a portable music player and a camcorder.

Expansion of use of the hard disk drive is sustained by the increased storage capacity and the reduced price. The storage capacity of a hard disk drive has been increased one hundred times for the last decade, whereas the price thereof has been decreased steadily. There is a strong demand for a device capable of storing enormous information in a cost-effective manner, which tendency is expected to last in the future. Under the circumstances, high accuracy and low price are all required in each part of the hard disk drive. A rotor hub, which is a subject matter of the present invention, does not constitute an exception to this tendency.

A dedicated special motor called a spindle motor is used in a hard disk drive 10 shown in FIG. 11. The spindle motor 11 plays a role in rotating hard disks 14 in the hard disk drive 10. Seeing that information is recorded on the hard disks 14 in an extremely high density, i.e., in a quite narrow interval, it is necessary for the spindle motor 11 to rotate the hard disks 14 with no vibration as far as possible. For that reason, the spindle motor 11 has a unique construction. For example, a high precise bearing called a fluid dynamic bearing is employed as a bearing for supporting a rotating shaft. No matter how accurate the bearing is, that alone is not sufficient to stably support the hard disks 14.

A rotor hub 21 plays an important role in stably supporting the hard disks 14. The spindle motor 11 and its neighboring portions shown in FIG. 11 are enlargedly illustrated in FIG. 12. The rotor hub 21 is supported by a bearing mechanism having a shaft 20 and a sleeve 22, thereby forming a rotating part. The hard disks 14 can be mounted on the rotor hub 21. The hard disks 14 are placed on a disk mounting surface 25 of the rotor hub 21 and are fixed to the rotor hub 21 by means of a clamp 28, with a spacer 27 interposed therebetween. If there is any eccentricity or strain in the rotor hub 21, it may be a direct cause of vibration of the hard disks 14. In this regard, the working accuracy of the disk mounting surface 25 is of particular importance. Accordingly, a highest degree of working accuracy is required in the rotor hub for use in the spindle motor. Taking this into account, the rotor hub has heretofore been manufactured through machining, e.g., cutting, which is known to provide a high degree of working accuracy.

However, cutting is costly to perform. In order for the hard disk drive to become cheaper and to be used more widely in the world, it is essential to reduce the manufacturing costs of the rotor hub. Examples of a cost reduction method include the methods disclosed in Japanese Patent Laid-open Publication Nos. 2003-285228 and 2005-205499. In these methods, a rotor hub of rough shape is formed by plastic working such as cold forging or the like and then finished by cutting or grinding. Use of the plastic working in combination makes it possible to reduce the cutting quantity of a material and to enjoy increased cutting accuracy.

With the two conventional methods mentioned above, it is possible to reduce the cutting quantity of a material but it is not easy to perform the cutting operation after the forging work. In particular, it is difficult to secure the accuracy of a disk mounting surface.

The present inventors made an attempt to use free-cutting stainless steel as a raw material of a rotor hub in an effort to assure easier cutting. If the free-cutting stainless steel is merely used in the two conventional methods, it is often the case that the stainless steel is cracked during the forging process. Furthermore, since the rotor hub is manufactured by plastic working, there is a fear that inclusions contained in the free-cutting stainless steel become easily separable. When separated, the inclusions adhere to hard disks. Such adherence of the inclusions is not permitted because the surfaces of the hard disks need to be kept clean.

SUMMARY OF THE INVENTION

In view of the above, the present invention provides a rotor hub that can be formed in a cost-effective manner and with increased accuracy.

One of the features of the present invention resides in that, when manufacturing a rotor hub for a spindle motor through the combined use of plastic working and cutting, free-cutting stainless steel containing a lot of sulfide particles for increased machinability is used as a raw material of the rotor hub and further that the size and orientation of inclusions present in the stainless steel is controlled by using the plastic working such as forging or the like. In addition, an intermediate member obtained by forging is subjected to machining over the substantially entire surface of a top panel portion thereof, thereby removing its superficial layer.

As a result, the inclusions present in the top panel portion are obliquely laid down or crushed into a small size, which restrains the inclusions from being separated from the top panel portion. Moreover, even when the top panel portion has an extremely thin region, it is possible to prevent the inclusions from penetrating that region. Separation of the inclusions is further restrained by removing the superficial layer. In order to obtain such a rotor hub, upsetting is performed particularly on the top panel portion during the plastic working with an upsetting percentage of 30% to 70%. By doing so, it is possible to restrain breakage of the rotor hub during the plastic working and to control the orientation of the inclusions present in the top panel portion. This makes it possible to reduce separation of the inclusions and to prevent contamination of the surfaces of hard disks.

Separation of the inclusions present in the disk mounting surface can also be reduced by allowing the inclusions to extend obliquely with respect to the disk mounting surface. Since a disk comes into direct contact with the disk mounting surface, it is more preferable to reliably restrain separation of the inclusions by inclining the inclusions at 45 degrees or more.

With the present invention, use of the free-cutting stainless steel as a raw material of the rotor hub makes it easy to perform a cutting operation after forging. This improves working accuracy without reduction in productivity. In case of forming an article by forging or pressing, it is typical that free-cutting stainless steel is not used because priority is given to formability. In the present invention, however, free-cutting stainless steel is used in consideration of the cutting operation after forging. Use of the free-cutting stainless steel requires some conditions to the forging and makes the forging more difficult to perform than a typical one. Nevertheless, the cutting operation after forging becomes easy to perform, thus increasing the productivity as a whole and eventually reducing the manufacturing costs.

It is one of the features of the present invention that, after forging or pressing, the rotor hub is annealed at a temperature higher than the recrystallization temperature. The annealing induces recrystallization of the rotor hub and removes residual stresses generated in the course of plastic working. Recrystallization improves machinability of the rotor hub. The machinability is further increased if the annealing temperature is in a range of from 700° C. to 830° C.

The present inventors have noted the bar of free-cutting stainless steel usable as a raw material of the rotor hub. In the present invention which is conditioned to perform forging or pressing, it is possible to take advantage of elongated inclusions present in the bar. Such elongated inclusions present in the bar may possibly penetrate the top panel portion of the rotor hub. However, the present invention is free from that kind of fear, because the elongated inclusions can be shortened or obliquely laid down by forging.

One example of free-cutting stainless steel for use in producing the bar having elongated inclusions includes ferritic free-cutting stainless steel containing P, Mn, S and Cu of specified content ranges. In these content ranges, elongated inclusions are easily formed. Furthermore, the ferritic free-cutting stainless steel of these content ranges is relatively hard to crack and therefore can be easily forged or pressed.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

1. Features of Rotor Hub

Figure 1:
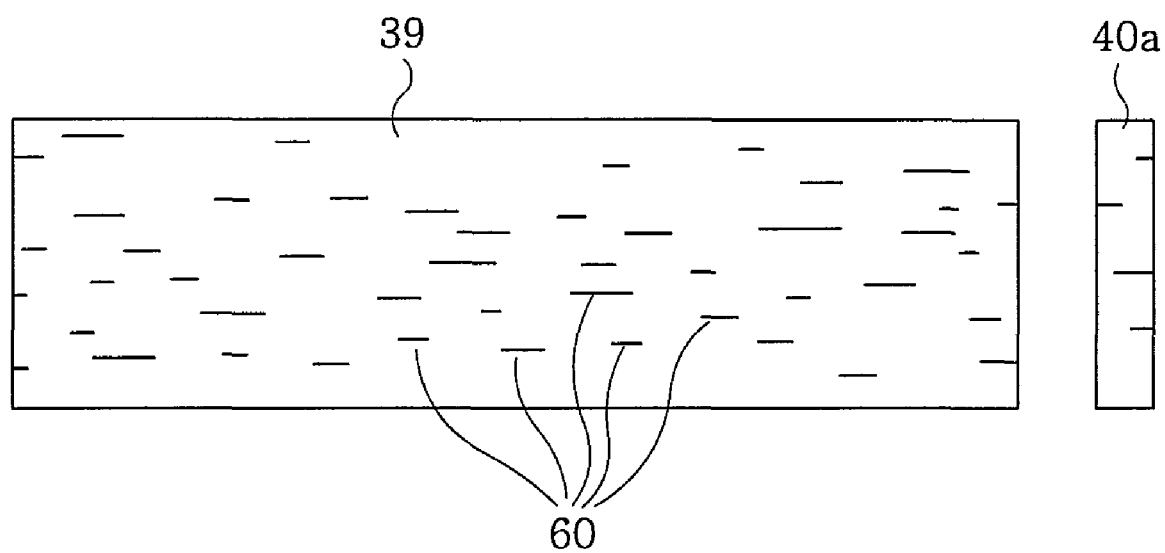
FIG. 1 is a schematic diagram showing a steel bar used as a raw material in the present invention and a slug obtainable from the steel bar.

Referring to FIGS. 1 through 3, features of a rotor hub in accordance with an embodiment of the present invention will be described in comparison with a conventional rotor hub.

FIG. 1 shows a bar of ferritic free-cutting stainless steel and a disc-like slug 40*a* obtained by cutting the bar into a specified length. The bar and the slug are all shown in cross section taken along a longitudinal direction thereof. Inclusions 60 appearing in the cross section are indicated by a multiplicity of line segments. Free-cutting stainless steel contains a lot of elongated inclusions. During a cutting work, the inclusions act as chasms and assure easier cutting. The bar is elongated in the course of rolling, as a result of which the inclusions are also deformed and elongated. The elongated inclusions are referred to as A-type inclusions.

The term "A-type inclusions" is defined in JIS G0555 of Japanese Industrial Standards, according to which the A-type inclusions refer to "non-metallic inclusions subjected to viscous deformation". This definition will apply in the subject specification.

Figure 2A:
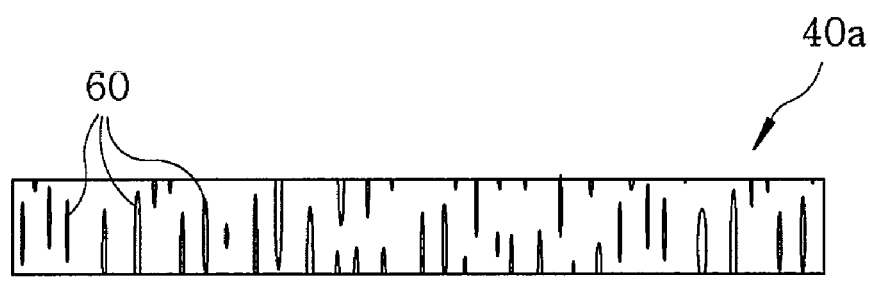
FIGS. 2A and 2B are schematic diagrams showing a slug provided for forging in the present invention and an intermediate member obtainable by forging.
Figure 2B:
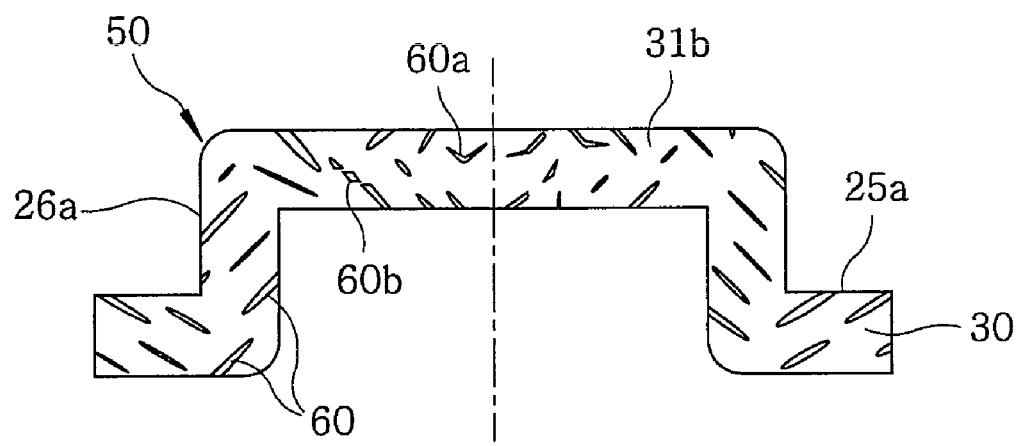

FIG. 2A is a schematic diagram showing a cross section of a slug 40*a* obtained by cutting a bar of ferritic free-cutting stainless steel into a specified length. The up-and-down direction in this figure corresponds to the longitudinal direction of the bar. The thickness direction of the slug 40*a* coincides with the longitudinal direction of the bar. FIG. 2B shows an intermediate member 50 obtained by forging the slug 40*a* shown in FIG. 2A. The slug 40*a* shown in FIG. 2A is arranged to correspond, in direction, to the intermediate member 50. The up-and-down direction in FIGS. 2A and 2B is the thickness direction of the slug 40*a*, which coincides with the longitudinal direction of a raw bar 39.

A rough shape of the rotor hub appears in the intermediate member 50. Reference numeral 26*a* designates a surface which will be cut into a cylindrical disk fitting surface. This surface is of a generally cylindrical shape in this stage. FIG. 2B shows a cross section obtained by sectioning the intermediate member 50 with a plane including the center axis of the cylindrical surface. The inclusions 60 are indicated by elongated ellipses in the cross section. The intermediate member 50 will be finished later into the rotor hub of the present invention through a cutting work.

In FIG. 2B, the intermediate member 50 is sectioned along the plane including the center axis. This means that the cross section shown in FIG. 2B is a cross section obtained by sectioning the intermediate member 50 into two equal parts. Even if the intermediate member 50 is not sectioned into two equal parts, the orientation of inclusions similar to that shown in FIG. 2B is observed in a cross section taken along the center axis. In this regard, the cross section taken along the center axis refers to a cross section parallel to the center axis.

One of the features of the present invention appears in the orientation of the inclusions 60 present in a disk mounting portion 30b before it is finished, the disk mounting portion having a disk mounting surface 25a formed after a finishing work, and in a top panel portion 31b before it is finished. The inclusions are kept askew in these portions. The inclusions were originally arranged to extend in the thickness direction of the slug 40a. During a forging work, the inclusions are intentionally pressed and crushed in the thickness direction, as a result of which the inclusions undergo plastic flow in the transverse direction. Thus, the inclusions are turned and oriented obliquely. A lot of the inclusions are deformed as designated by 60a or severed as designated by 60b particularly in the top panel portion. As a result of such inclination and severance, the size of the inclusions measured in the thickness direction becomes small. On the cylindrical disk fitting surface 26a before a finishing work, the inclusions present in the intermediate member 50 are heavily inclined.

It is thought that the shape and orientation of the inclusions has a great influence on machinability. With the present embodiment, however, the tool life and the finishing quality of cut surfaces are as good as available in the conventional rotor hub manufacturing methods that do not use plastic working in combination.

Figure 3A:
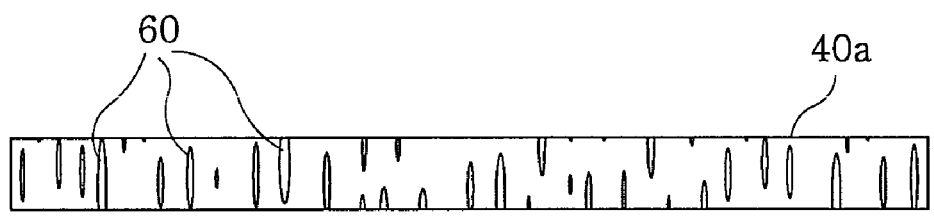
FIGS. 3A and 3B are schematic diagrams showing another example of the slug provided for forging in the present invention and another example of the intermediate member obtainable by forging.
Figure 3B:
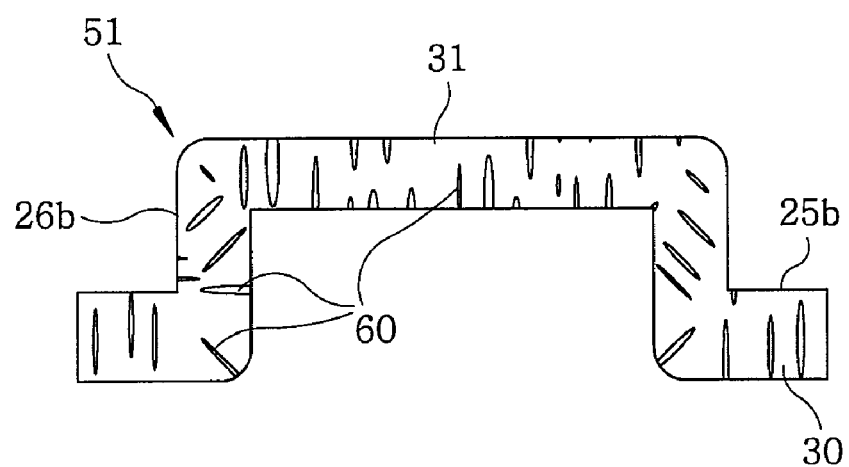

FIGS. 3A and 3B show another example of the slug and the intermediate member. In this example, the direction of inclusions 60 present in a top panel portion 31 and a disk mounting portion 30 is not changed during a forging work. Therefore, the inclusions 60 in an intermediate member 51 are arranged substantially at a right angle with respect to the surfaces of the respective portions. However, the inclusions present in a disk fitting portion 26b before it is finished are oriented obliquely with respect to a cylindrical disk fitting surface 26a before a finishing work. This is because drawing is performed with respect to the disk fitting portion 26b during a forging work. As will be described later, it is thought that such oblique orientation makes the inclusions 60 hard to separate. Since the inner edge of a hard disk would come into contact with the cylindrical disk fitting surface, it is believed that the oblique orientation of the inclusions in the disk fitting portion is effective in restraining contamination of the disk surface which would be caused by particles of the inclusions.

Seeing that FIGS. 1 through 3B referred to in the foregoing description are schematic diagrams, the shapes and sizes of the inclusions 60, the intermediate member 50 and the slug 40a are not strictly the same as the actual ones.

2. Manufacturing Method of the Rotor Hub

Description will now be made on a manufacturing method of the rotor hub in accordance with the embodiment of the present invention.

Selected as a raw material is ferritic free-cutting stainless steel having components as shown in Table 1.

TABLE 1

| C | Si | Mn | P | S | Cr | Mo | Ni | Cu |
|---|---|---|---|---|---|---|---|---|
| | | | | | | | (unit: wt %) | |
| 0.02 | 0.29 | 0.23 | 0.089 | 0.191 | 18.51 | 0.03 | 0.12 | 0.83 |

(The balance is iron and unavoidable impurities)

Figure 4A:
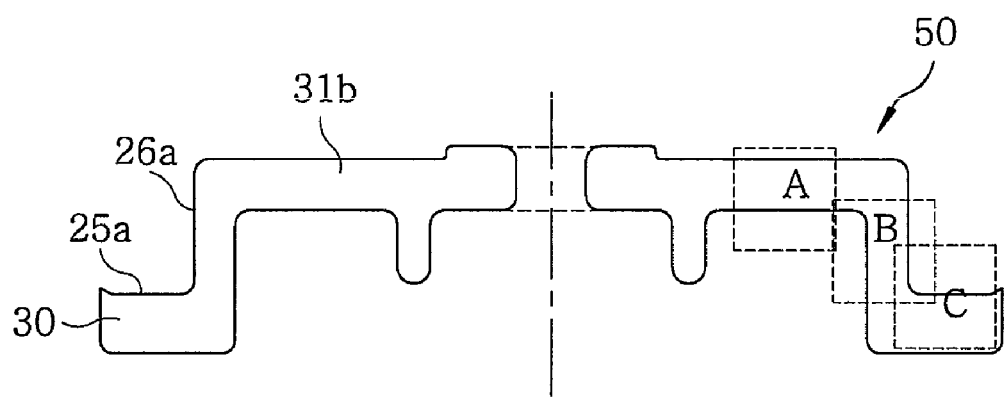
FIGS. 4A and 4B are schematic diagrams showing an intermediate member obtainable by forging in the present invention and a rotor hub producible by finishing the intermediate member.

First, a bar of the ferritic free-cutting stainless steel is prepared in a raw material preparation step. Next, in a slug preparation step, the bar is cut at a right angle with respect to the rolling direction thereof, thereby obtaining a slug of 24 mm in diameter and 2 mm in thickness. Then, a cold forging work is performed as a plastic working step. During the forging work, the top panel portion is subjected to upsetting at an upsetting ratio of 50% in the rolling direction of the raw material (in the thickness direction), thereby obtaining an intermediate member 50 as shown in FIG. 4A. In the plastic working step, it may be possible to use other plastic working methods such as pressing and the like in addition to or in place of the forging work. While upsetting needs to be performed on the top panel portion, other portions than the top panel portion may be subjected to drawing.

In an annealing step, the intermediate member 50 is annealed at 800° C. for four hours. It is the easiest annealing method that the intermediate member having a top panel portion and a disk mounting portion is put into an annealing furnace kept at 800° C. and is then annealed in its entirety. During the annealing step, recrystallization occurs to thereby eliminate residual stresses after the forging, and crystal grains are coarsened. The coarsening of the crystal grains helps improve machinability. Elimination of the residual stresses leads to improved dimensional accuracy of the rotor hub as a target product. In order to eliminate the residual stresses, it is preferred that heavily plastic-worked regions are subjected to recrystallization. For that reason, it is preferred that the annealing temperature should be chosen so as to occur the recrystallization. Annealing at 700° C. or more improves machinability. If the annealing temperature exceeds 830° C., however, toughness is increased and cutting resistance grows higher. This means that the annealing is preferably performed at a temperature of 830° C. or less.

Figure 4B:
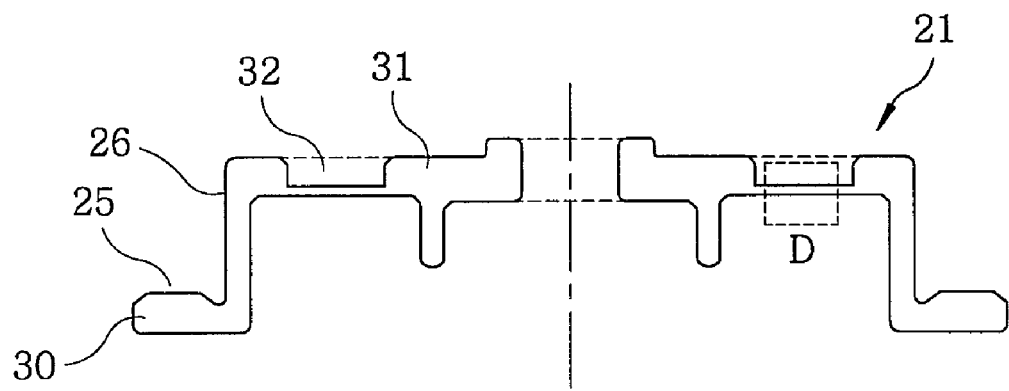

The intermediate member 50 thus annealed is subjected to a cutting work using a lathe, thereby obtaining a rotor hub 21 as shown in FIG. 4B. In the cutting work, the entire surfaces of the intermediate member are cut thin to remove the oxide layer generated in the annealing step. One axial end surface of the disk mounting portion is particularly carefully cut to form a disk mounting surface.

The cutting work includes a top panel portion cutting step for performing a cutting work on the surface of the top panel portion, a cylindrical disk fitting surface cutting step for performing a cutting work on the cylindrical disk fitting surface, and a disk mounting surface cutting step for performing a cutting work on the disk mounting surface. These three machining steps can be performed as a part of a series of cutting works.

As a consequence of this cutting work, the entire upper surface of the top panel portion 31 of the rotor hub 21 becomes a machined surface. In addition to the upper surface of the top panel portion 31, the lower surface of the top panel portion 31, the surface of the disk mounting portion 30, the cylindrical disk fitting surface 26 and the inner surface of the disk fitting portion 26b are also turned to machined surfaces. This means that the whole surfaces of the rotor hub 21 are machined surfaces. The oxide layer generated in the annealing step is removed by cutting the whole surfaces of the intermediate member 50. Even when no annealing is performed, it is effective that machining is performed in order to remove surface roughness of the intermediate member.

In order to completely remove the roughened surface layers of the intermediate member 50, it is necessary to machine the whole surfaces thereof. In case where the purpose of machining is to merely reduce the percentage of the roughened layers, however, there is no need to machine the whole surfaces of the intermediate member 50. In case of the upper surface of the top panel portion, the region of about 90% in an area ratio may be machined to shorten the time required in the machining work.

In the present embodiment, the inclusions that impart improved machinability to the free-cutting stainless steel are heavily deformed. For that reason, there may be something to worry about the possible adverse affect on the machinability.

However, as compared to a case that the free-cutting stainless steel is cut without undergoing any plastic working, no undesirable phenomenon such as an increase in the cutting resistance or a decrease in the tool life appears in the afore-mentioned cutting work. Thus, the intermediate member shows good machinability, which makes it easy to secure accuracy of the disk mounting surface. In addition to or in place of the cutting work, grinding or polishing may be used as the machining work.

Figure 11:
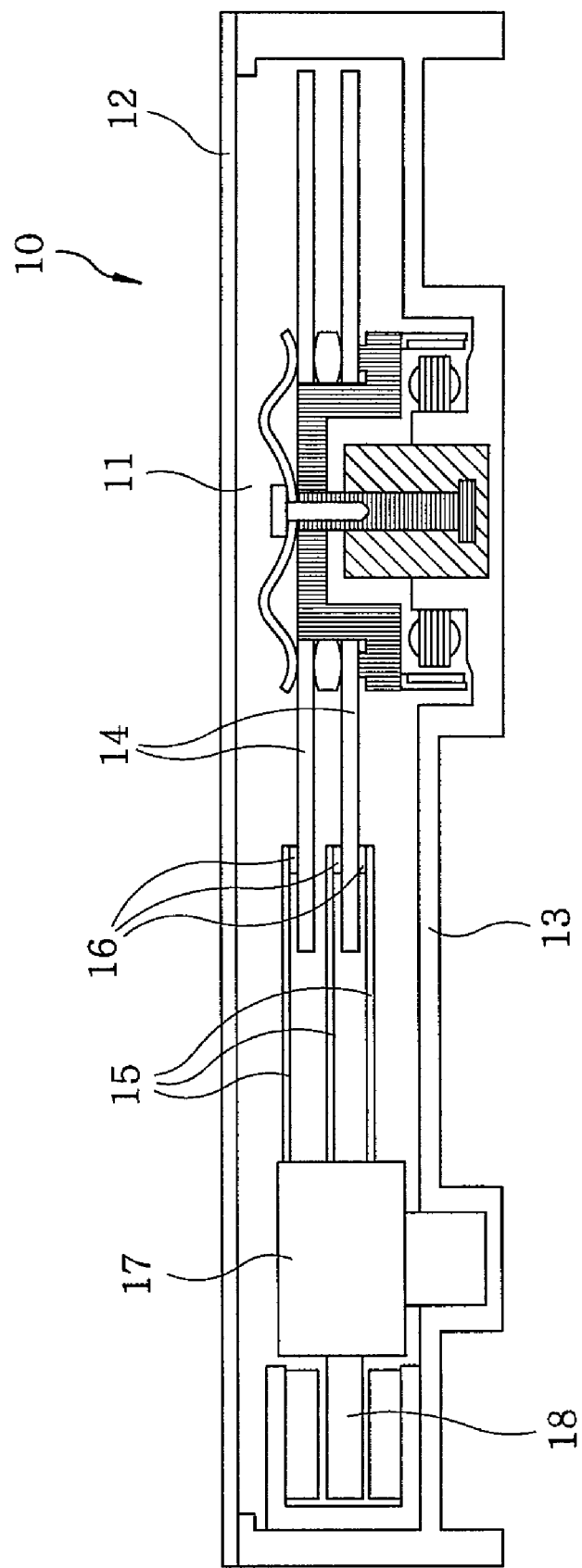
FIG. 11 is a view showing a hard disk drive in accordance with the present invention.
Figure 12:
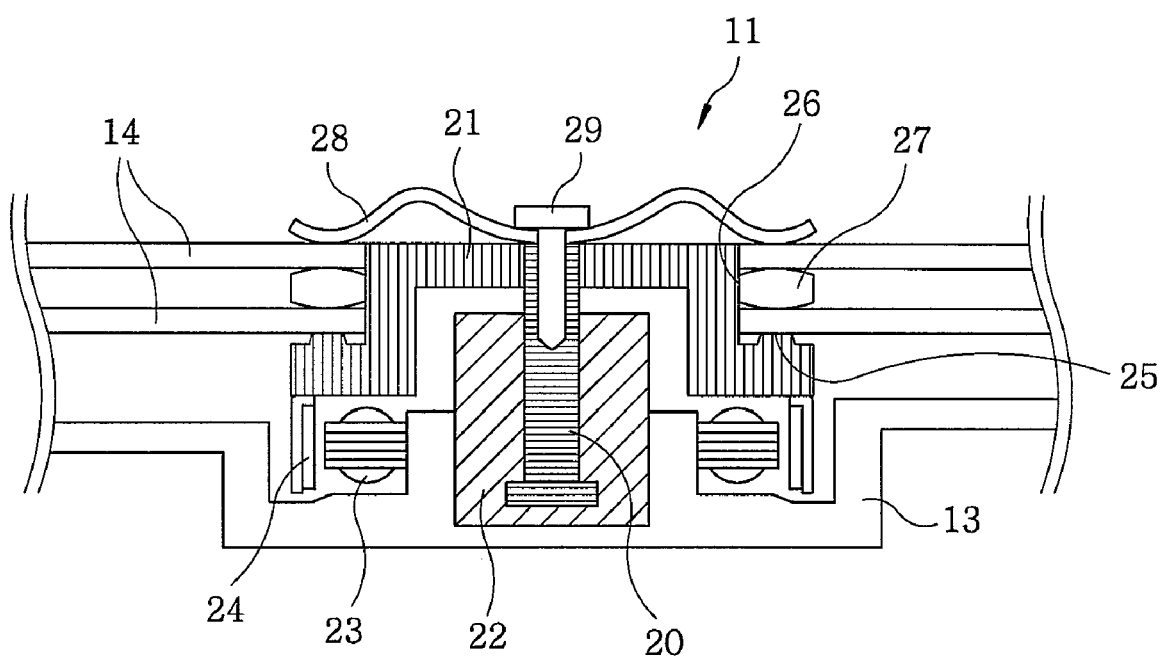
FIG. 12 is a view showing a spindle motor in accordance with the present invention.

A spindle motor 11 as shown in FIG. 12 is fabricated using the rotor hub thus obtained. A hard disk drive 10 equipped with the spindle motor 11 is shown in FIG. 11.

In the present embodiment, an upsetting percentage (%) is defined by the following equation:

$$\text{Upsetting percentage}(\%) = [(H-h)/H] \times 100$$

where H denotes the thickness of the raw material and h stands for the thickness of the intermediate member after it is forged.

In other words, the upsetting percentage represents, by percentage, the degree of reduction in the thickness of the intermediate member relative to the thickness of the raw material after the intermediate member is forged. For example, if the upsetting percentage is equal to 50%, the thickness h of the intermediate member after it is forged is one half of the thickness of the raw material.

In the portion of the intermediate member which would become the top panel portion of the rotor hub, the upsetting percentage needs to be 30% or more. However, it is undesirable that the upsetting percentage exceeds 70%. By the upsetting percentage of 30% or more, it does not mean that this upsetting percentage applies to the entirety of the slug. Insofar as the upsetting percentage of at least a portion of the slug is 30% or more, separation of the inclusions is restrained in that portion, which reduces separation of the inclusions in the rotor hub as a whole. Similarly, the upsetting percentage of 70% or less means that the upsetting percentage in the most heavily upset region of the top panel portion does not exceed 70%.

3. Components of the Raw Material

Free-cutting stainless steel usable in the present invention is not limited to the ferritic free-cutting stainless steel whose components are shown in Table 1. There exist various kinds of free-cutting stainless steel having many different components, which may also be used as the raw material in the present invention. In case where free-cutting stainless steel having components other than shown in Table 1 is used as the raw material, however, cracks are easily generated during the forging work, which imposes restriction on the forging shape and the upsetting percentage. Therefore, care should be taken in doing so.

In case of selecting ferritic free-cutting stainless steel as the raw material, it is preferred that the contents of P, S, Mn and Cu fall within respective specified ranges. Specifically, the ferritic free-cutting stainless steel contains 0.05 to 0.15% of P, 0.10 to 0.30% of S, 0.15 to 0.30% of Mn and 0.40 to 1.00% of Cu. The ferritic free-cutting stainless steel of these content ranges is less susceptible to cracking even when upsetting is performed during the forging work. Moreover, the ferritic free-cutting stainless steel exhibits good machinability.

In the ferritic free-cutting stainless steel of these content ranges, a lot of elongated inclusions having a length of greater than 100 μm appear in the cross section of a steel piece. Therefore, an undesirable phenomenon such as penetration of the top panel portion by the inclusions or separation of a lot of the inclusions occurs in the stainless steel-made rotor hub produced by a cutting work alone or by the combined use of cutting and forging works with no sufficient deformation of the inclusions made during the forging work. However, the present invention does not suffer from the afore-mentioned problem because the inclusions are deformed and severed during the forging work. That is to say, in the present invention, it is possible to use the materials that cannot be used as the raw material of the rotor hub in a conventional case.

Example

1. Status of Inclusions in the Present Rotor Hub

The intermediate member 50 of the present invention, the shape of inclusions appearing in the cross section thereof and an actual example of the inclusion inclining method will be described with reference to FIGS. 4 through 9.

FIG. 4A shows an overall cross-sectional shape of the intermediate member 50. An annular surface 25a that would become a disk mounting surface after a finishing work is formed on a disk mounting portion 30. Also formed is a cylindrical surface 26a that would become a cylindrical disk fitting surface after the finishing work. FIG. 4A is a sectional view obtainable by sectioning the intermediate member 50 along a plane including the center axis of the annular surface 25a. In FIG. 4A, areas A, B and C designate a region corresponding to the top panel portion 31 of the intermediate member, a region just below the cylindrical disk fitting surface 26a of the intermediate member and a region just below the disk mounting surface 25a of the intermediate member, respectively. Micrographs corresponding to these regions are illustrated in FIGS. 5A, 5B, 6A, 6B, 7A and 7B.

Figure 8:
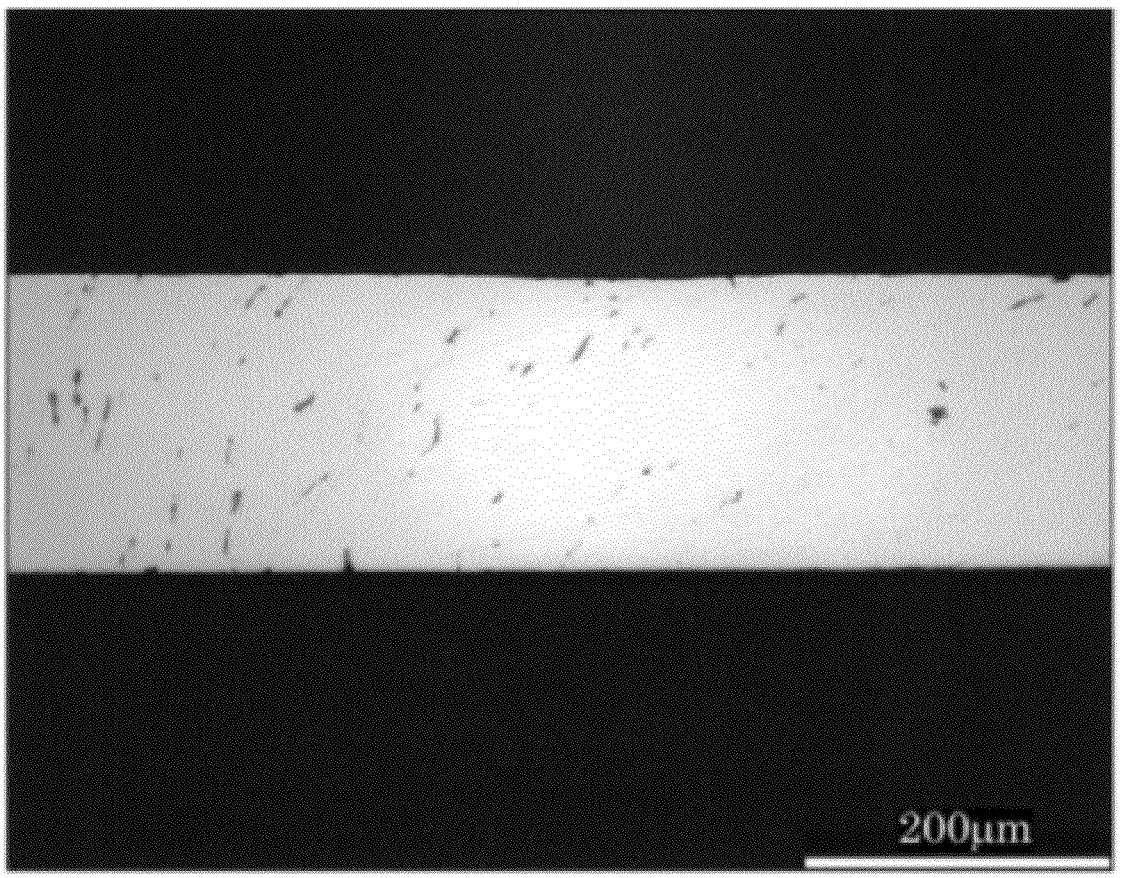
FIG. 8 is a micrograph illustrating the shape of inclusions present in a particularly thin wall region of a top panel portion of the present rotor hub.

FIG. 4B shows a rotor hub 21 finished by applying a cutting work to the intermediate member 50. In case of the rotor hub 21 shown in FIG. 4B, balance correction holes 32 are formed in the top panel portion 31. The top panel portion 31 is thinnest in the region where the balance correction holes 32 are formed. In FIG. 4B, area D designates the thinnest region, the micrograph of which is illustrated in FIG. 8. The viewing field A in FIG. 4A corresponds to this thinnest region. In FIG. 4A, the viewing field A is the thinnest region of the top panel portion 31b.

Referring to FIG. 4B, the top panel portion 31 has a generally plate-like circular shape extending away from the center axis. The disk mounting portion 30 is positioned radially outwardly of the top panel portion 31. The disk mounting surface 25 refers to a surface of the disk mounting portion 30 that faces upwardly along the center axis.

Figure 5A:
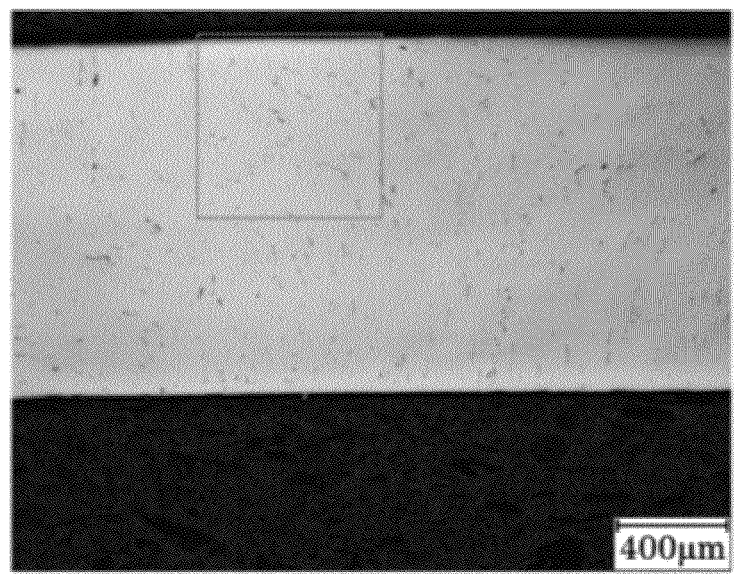
FIGS. 5A and 5B are micrographs illustrating the shape of inclusions present in a top panel portion of the present rotor hub.
Figure 5B:
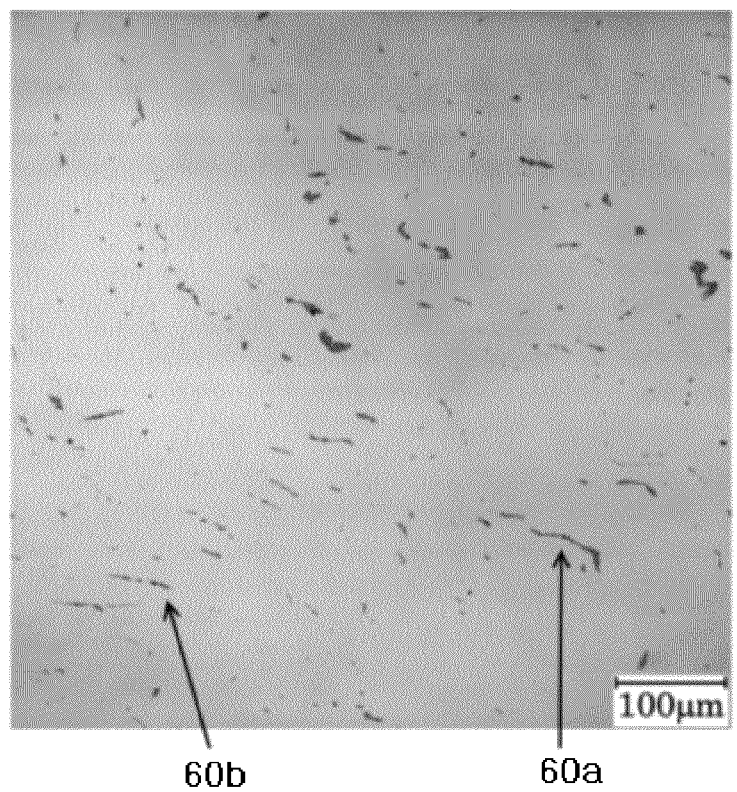
Figure 6A:
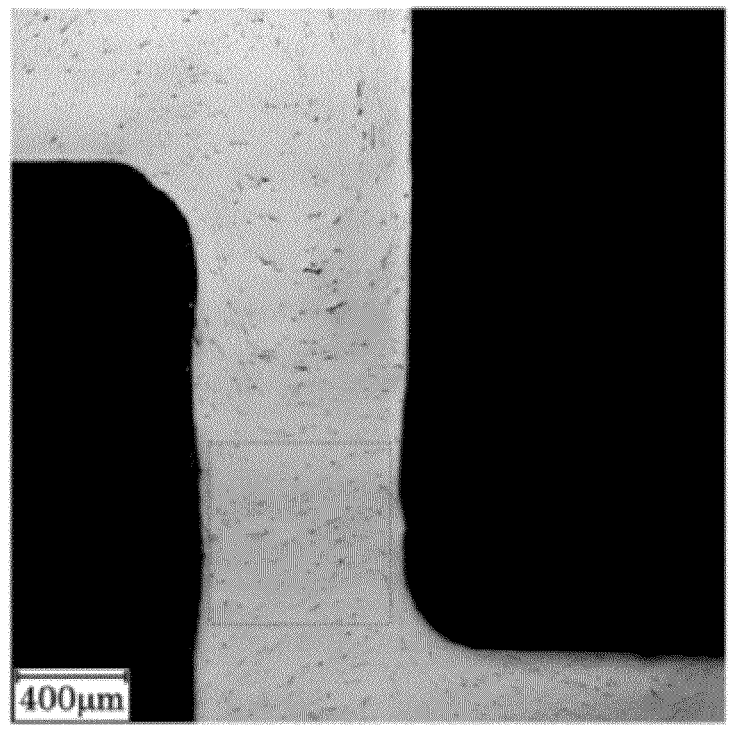
FIGS. 6A and 6B are micrographs illustrating the shape of inclusions present in a disk fitting portion of the present rotor hub.
Figure 6B:
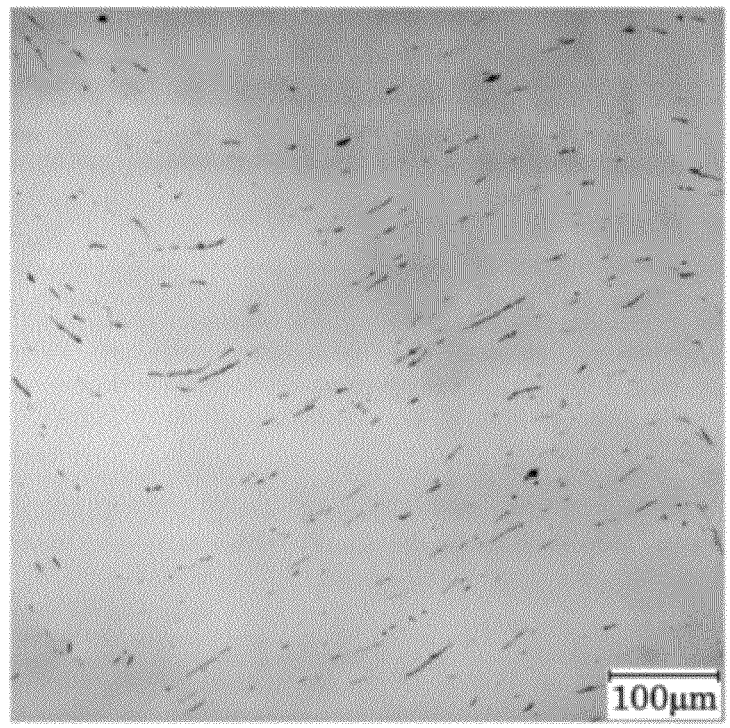
Figure 7A:
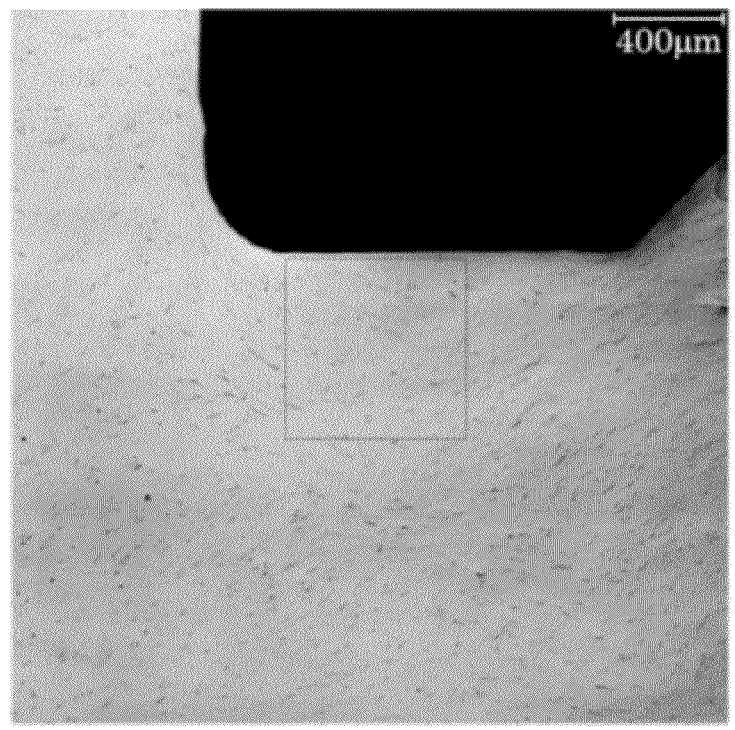
FIGS. 7A and 7B are micrographs illustrating the shape of inclusions present just below a disk mounting surface of the present rotor hub.
Figure 7B:
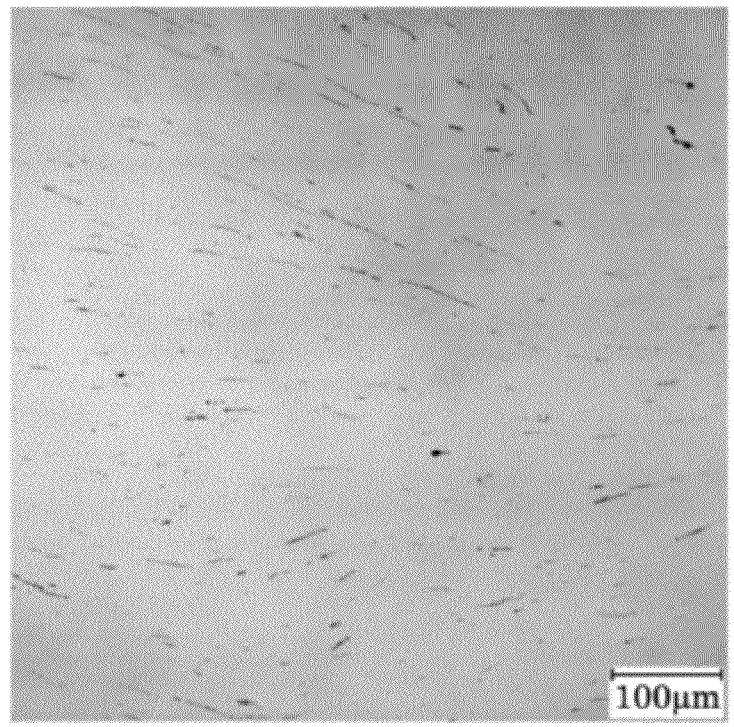

FIGS. 5A, 6A and 7A are micrographs of low magnification, whereas FIGS. 5B, 6B and 7B are micrographs of high magnification. The square regions surrounded by dot lines in FIGS. 5A, 6A and 7A are viewing fields of the micrographs illustrated in FIGS. 5B, 6B and 7B. The up-and-down direction in these micrographs coincides with that in FIGS. 4A and 4B. In each figure, the white area is the cross section of the intermediate member, and the elongated black grains appearing in the cross section are the inclusions. Although the existence of the inclusions can be recognized in the micrographs of low magnification (FIGS. 5A, 6A and 7A), it is possible to more clearly observe the shape of the respective inclusions in the micrographs of high magnification (FIGS. 5B, 6B and 7B). In case where the slug is formed into the shape of the rotor hub merely through a cutting work as shown in FIGS. 2A and 2B, the inclusions would be arranged to extend in the up-and-down direction in the micrographs. In the intermediate member of the present embodiment, however, the inclusions are greatly inclined with respect to the up-and-down direction as is apparent in FIGS. 5B, 6B and 7B. Since the disk mounting surface extends in the horizontal direction as illustrated in FIG. 7A, the inclusions are oriented obliquely with respect to the disk mounting surface or generally parallel to the disk mounting surface. In FIGS. 6A and 6B, the inclusions are oriented obliquely in their entirety. Similarly, in FIGS. 5A and 5B, the inclusions are oriented obliquely with respect to the surface of the top panel portion. A lot of deformed inclusions 60a and severed inclusions 60b are seen in the micrographs illustrated in FIGS. 5A and 5B. This is because upsetting has been positively performed in the forging work.

FIG. 8 is a micrograph of the region designated by the viewing field D in FIG. 4B. The thickness of the top panel portion in this region is reduced to about 0.2 mm as a result of the cutting work performed after forging. The up-and-down direction in the micrograph is the same as the rolling direction of the bar, and most of the inclusions were originally oriented in this direction. The length of the inclusions appearing in the cross section is quite smaller than 0.2 mm. The longest one of the inclusions in the micrograph has a length of 26 µm at most.

Figure 9:
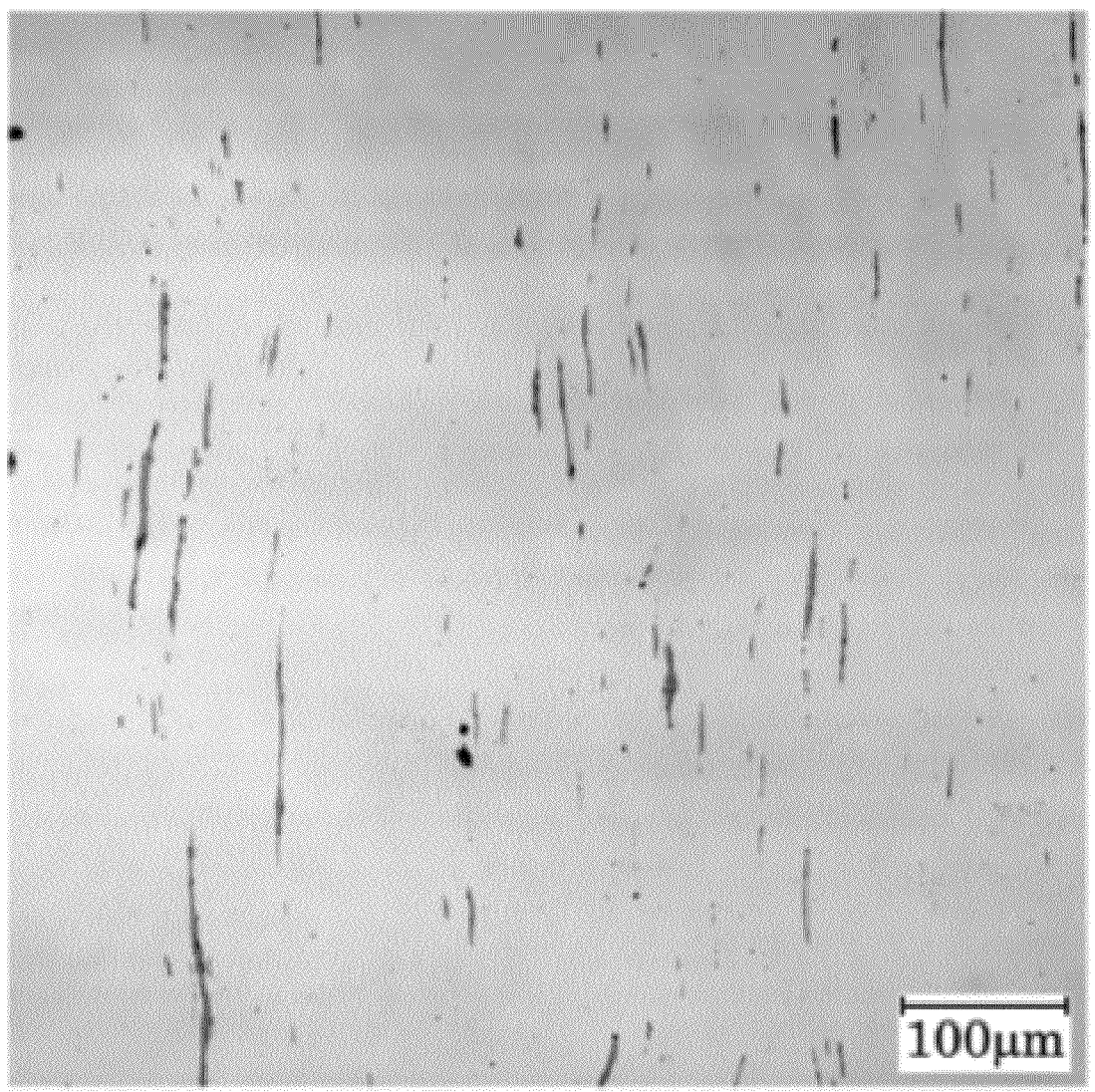
FIG. 9 is a micrograph illustrating the shape of inclusions present in the bar used as a raw material in the present invention.

FIG. 9 is a micrograph of the bar used as the raw material. In this micrograph, all of the inclusions extend in the up-and-down direction. As compared to the micrographs illustrated in FIGS. 5A through 8, the inclusions are very long. It can be appreciated that the inclusions are severed short when the orientation of the inclusions is changed by forging.

2. Measurement of the Inclusions

Description will now be made on the measurement results of the inclusions observed in the micrographs illustrated in FIGS. 5A through 9.

2-1. Azimuth Angle Measuring Method

The micrographs are stored as digital image data and provided to image processing. Preprocessing, i.e., contour detection and binarization, is first performed on the digital image data. Then, the azimuth angle of each grain is measured using grain measurement software. In measuring the azimuth angle, an ellipse most suitably conforming to each grain is calculated. The direction of a major axis of the ellipse is regarded as a direction in which each grain extends. Also measured are the major and minor axes of the ellipse.

In the present invention, attention is paid to the inclusions, particularly the A-type inclusions. As mentioned earlier, the A-type inclusions refer to "non-metallic inclusions subjected to viscous deformation". It is certain that the elongated inclusions extending in one direction in the free-cutting stainless steel are generated as a result of viscous deformation. In order to avoid ambiguity, the inclusions in which the ratio of a major axis to a minor axis is equal to or greater than 2 are regarded as the A-type inclusions in the subject specification. The term "A-type inclusions" is also used in the claims in the same sense that the ratio of a major axis to a minor axis is equal to or greater than 2. Based on the measurement results of the major axis and the minor axis, those inclusions with the axis ratio of 2 or more are sorted and analyzed.

The average value of the azimuth angles of the A-type inclusions was found in each micrograph. The average value thus found refers to an average value weighted by the major axis length of the respective inclusions. More specifically, the weighted average value was obtained by multiplying the angle of each grain and the major axis length of each grain together, calculating the total sum of the products and then dividing the total sum of the products by the total sum of the major axis length. The angle thus averaged is expressed in terms of the absolute value of a deviation from the center axis of the cylindrical surface 26a of the intermediate member 50, as long as the top panel portion and the disk mounting portion are concerned. In other words, the angle of the inclusions extending upright in the micrographs is zero degree. The inclusions inclined 20 degrees to the right and the inclusions inclined 20 degrees to the left are all regarded as being inclined 20 degrees. As for the disk fitting portion, the direction perpendicular to the center axis, i.e., the horizontal direction in the micrographs, is regarded as zero degree. This is because the disk fitting portion would be bent 90 degrees during a forging work.

2-2. Measurement Results of the Azimuth Angle of Inclusions

The measurement results of the azimuth angle of the inclusions appearing in the micrographs illustrated in FIGS. 5A through 8 are shown in Table 2. Measurement was performed on the inclusions appearing in the micrographs illustrated in FIGS. 5B, 6B, 7B and 8. The azimuth angle of the inclusions was also measured in respect of the micrograph illustrated in FIG. 9, which is a sectional view of the bar.

TABLE 2

|  | Top Panel Portion | Disk Fitting Portion | Disk Mounting Portion | Thin Wall Portion | Bar |
|---|---|---|---|---|---|
| Weighted Average Angle (degree) | 58.5 | 27.8 | 74.1 | 31.8 | 9.5 |
| Maximum Thicknesswise Size (µm) | 33.5 | 60.3 | 25.0 | 25.1 | 144.8 |

Assuming that the up-and-down direction in the micrographs is zero degree, the inclusions are inclined 58.5 degrees in the top panel portion. Assuming that the left-and-right direction in the micrographs is zero degree, the inclusions are inclined 27.8 degrees in the disk fitting portion. In the disk mounting portion, the inclusions are inclined 74.1 degrees on the assumption that the up-and-down direction in the micrographs is zero degree. In the top panel portion, a large number of the inclusions are inclined, heavily deformed and bent. Although deformation of the inclusions is also conspicuous in the disk mounting portion, the inclusions has an elongated shape in that portion.

The maximum sizes of the A-type inclusions measured in the thickness direction of the respective portions are also shown in Table 2. It can be seen in Table 2 that the maximum inclusion sizes in the respective portions are quite smaller than that in the bar as a raw material. Since the thin wall portion illustrated in FIG. 8 has a thickness of 0.2 mm at most, there may be a fear that the inclusions of 140 µm or more in length would penetrate the thin wall portion if the inclusions of such size are present in the thin wall portion as is the case in the bar. However, the present rotor hub is free from that kind of fear.

Figure 10:
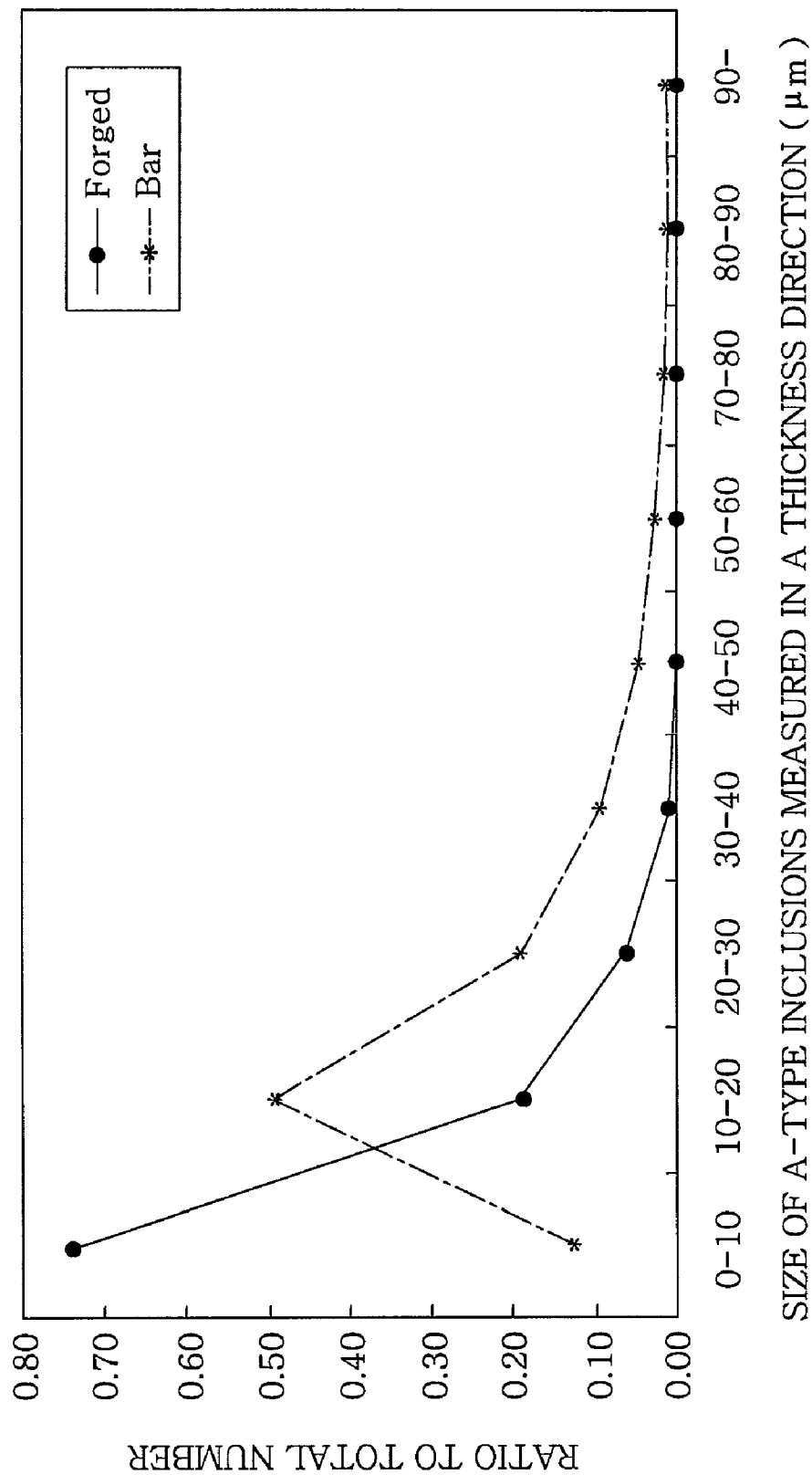
FIG. 10 is a graph representing the frequencies of length of A-type inclusions present in the bar used as a raw material and in the top panel portion of a finished rotor hub of the present invention, wherein the length of the inclusions is measured in a thickness direction of the bar and the top panel portion of the finished rotor hub.

2-3. Measurement Results of the Thicknesswise Size of Inclusions Present in the Top Panel Portion A histogram was prepared by measuring the thicknesswise size of the A-type inclusions present in the top panel portion over an area of 5.55 mm². In this regard, the term "thicknesswise" means the direction parallel to the center axis of the rotor hub. According to this measuring method, the inclusions inclined relative the center axis show a reduced thicknesswise size even if they have the same length. For the purpose of comparison, a similar histogram was prepared by measuring the thicknesswise size of the A-type inclusions present in the bar over an area of 3.28 mm². The results are represented in FIG. 10. The vertical axis in this figure shows the ratio obtained by dividing the number of the A-type inclusions falling within the respective size sections by the total number of the A-type inclusions measured. In FIG. 10, the black-circle curve shows the measurement results in the top panel portion, and the asterisk curve indicates the measurement results in the bar.

A large number of big inclusions and a small number of small inclusions with a size of less than 10 μm are present in the bar. In case of the present invention, few inclusions have a size of greater than 50 μm and the inclusions having a size of less than 10 μm are present in a large number. Presumably, this is because the inclusions have been deformed and severed by the forging work and because the inclusions have been inclined to have a reduced thicknesswise size.

When the cross section is observed over an area of 5.55 mm$^2$, only one inclusion having a thicknesswise size of greater than 50 μm was found in the rotor hub of the present invention. In contrast, sixty eight inclusions having a thicknesswise size of greater than 50 μm were found in the bar used as a raw material, when observation is made over an area of 3.28 mm$^2$. With respect to the bar, additional investigation was conducted over a broad area using a microscope-mounted image analysis system (Luzex F, a product of Nireco Corp., Japan). At this time, attention was drawn to the inclusions having a length of 100 μm or more. As a result of the investigation, two hundred and seven inclusions having a length of 100 μm or more were found in an area of 39.1 mm$^2$. It can be seen that, while a large number of big inclusions are present in the raw material, the number of big inclusions is sharply decreased in the finished rotor hub.

3. Determination of the quantity of Inclusions Separated

Seven rotor hubs of the present invention and seven rotor hubs subjected to only cutting but not forging were prepared to determine how many inclusions are separated from the rotor hubs.

3-1. Measurement Method and Condition

Prior to being used in the measurement, the rotor hubs thus prepared were cleansed under a specified condition to sufficiently remove contaminants.

Next, one of the rotor hubs was dipped into 1,000 cm$^3$ of pure water, and ultrasonic waves with a frequency of 68 kHz and output power of 170 W was applied to the pure water. At this time, the rotor hub is suspended with no contact with the wall surface of a vessel. Thereafter, 100 cm$^3$ of the pure water was put into a liquid particle counter to count the number of particles having a diameter of 0.5 μm or more. The number of particles thus counted was divided by the surface area of the rotor hub, thereby calculating the number of separated particles per unit area.

3-2. Results of Measurement

Figure 13:
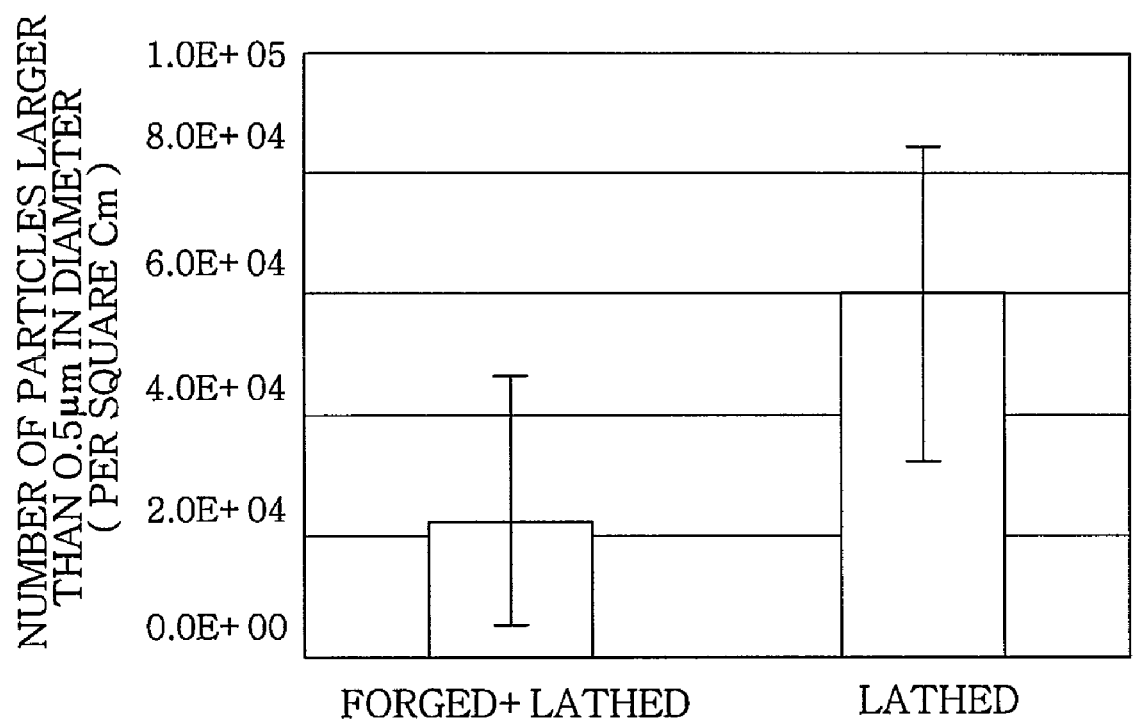
FIG. 13 is a view illustrating the results of measurement of the number of particles separated in the present rotor hub and the conventional rotor hub.

The results of measurement are shown in FIG. 13, in which the measurement value for the present rotor hub is indicated to read "Forged+Lathed", whereas the measurement value for the conventional rotor hub produced through a cutting work (lathing) alone is indicated to read "Lathed". The bar graph represents the average value for the seven rotor hubs. A pair of short horizontal straight lines at the opposite ends of a vertical straight line signifies the maximum value and the minimum value. As can be seen at a first glance, the average value and the maximum value in the measurement of the present rotor hub identified by "Forged+Lathed" are all reduced to about half of the average value and the maximum value for the conventional rotor hub produced through a cutting work alone.

The present rotor hub used in this measurement was made of ferritic free-cutting stainless steel having the components shown in Table 1. On the other hand, the conventional rotor hub was made of commercially available ferritic free-cutting stainless steel, which is called "DHS-1" (registered trademark). The DHS-1 differs in component from the free-cutting stainless steel shown in Table 1. Nevertheless, these two kinds of rotor hubs were equivalent in machinability.

3-3. Conclusion

As set forth above, the number of particles separated from the present rotor hub is smaller than that of the conventional rotor hub produced through a cutting work alone. It is presumed that separation of the inclusions is restrained by the deformation, severance and inclination thereof.

Although there is a possibility that the deformation of the inclusions may adversely affect machinability, such is not the case in reality. As a conclusion, the cutting quantity is reduced in the present invention, thereby assuring increased productivity. Furthermore, thanks to the reduction in the quantity of materials cut and wasted, it is possible to reduce manufacturing costs. In addition, the increased machinability makes it possible to secure working accuracy equivalent to that of the conventional rotor hub, even in the lathing of the disk mounting surface that requires a particularly high level of working accuracy.

Other Examples

FIG. 11 is a sectional view showing a hard disk drive 10 in accordance with the present invention. Hard disks 14 are mounted to a spindle motor 11. Magnetic heads 16 for recording and/or reproducing magnetic information on and/or from the hard disks 14 are arranged in proximity to the surfaces of the hard disks 14. The magnetic heads 16 are supported by arms 15 which in turn are swingably supported by a pivot 17. An actuator 18 is designed to move the magnetic heads 16 by imparting a swinging force to the arms 15 supported by the pivot 17.

FIG. 12 is a sectional view showing the spindle motor 11 in accordance with the present invention. A shaft 20 is rotatably supported by a sleeve 22. The rotor hub 21 of the present invention is fixed to the shaft 20 and rotated together with the shaft 20. The hard disks 14 are placed on the disk mounting surface 25 of the rotor hub 21. In this example, a spacer 27 is interposed between the hard disks 14. The two hard disks 14 are fixed in place by means of a clamp 28. The clamp 28 is secured to the shaft 20 by a fixing screw 29. A rotor magnet 24 is fixed to the lower portion of the rotor hub 21. A stator 23 is arranged in a facing relationship with the rotor magnet 24. Upon energizing the stator 23, a rotational driving force is applied to the rotor magnet 24.

While certain embodiments and examples of the present invention have been described hereinabove, the present invention is not limited thereto. Various modifications or changes may be made within the scope of the invention defined in the claims.

What is claimed is:

1. A rotor hub, for use in a hard disk drive spindle motor, comprising:
   an annular disk mounting portion including a center axis and a disk mounting surface defined on one side of the disk mounting portion along the center axis; and
   a disk fitting portion including a cylindrical disk fitting surface positioned radially inwardly of the disk mounting surface; wherein the rotor hub is a single seamless part made of free-cutting stainless steel and contains A-type inclusions appearing in a cross section taken along the center axis, the A-type inclusions being oriented to extend in directions different than the center axis, the orientation of the A-type inclusions on one radially opposite side of the cross section being opposite or substantially opposite from the orientation of the A-type inclusions on another radially opposite side of the cross section, the cylindrical disk fitting surface being machined substantially in its entirety.

2. The rotor hub of claim 1, further comprising a circular top panel portion extending away from the center axis, the top panel portion having an axial end surface machined substantially in its entirety.

3. The rotor hub of claim 2, wherein the A-type inclusions appearing in a cross section taken along the center axis in a thinnest region of the top panel portion include less than three inclusions having a size of greater than 50 μm distributed over a unit area of one square millimeter, the size being measured in a thickness direction of the top panel portion.

4. The rotor hub of claim 3, wherein the thinnest region of the top panel portion has a thickness of 0.5 mm or less.

5. The rotor hub of claim 1, wherein the free-cutting stainless steel comprises ferritic free-cutting stainless steel containing, by weight, 0.05 to 0.15% of P, 0.10 to 0.30% of S, 0.15 to 0.30% of Mn and 0.40 to 1.00% of Cu.

6. The rotor hub of claim 1, wherein an average value of deviation angles between the extension direction of the A-type inclusions and the center axis weighted by the length of each of the A-type inclusions is equal to or greater than 20 degrees at least in a region just below the disk mounting surface in a cross section of the disk mounting portion taken along a plane including the center axis.

7. The rotor hub of claim 2, wherein an average value of deviation angles between the extension direction of the A-type inclusions and the center axis weighted by the length of each of the A-type inclusions is equal to or greater than 20 degrees at least in a region just below the disk mounting surface in a cross section of the disk mounting portion taken along a plane including the center axis.

8. The rotor hub of claim 3, wherein an average value of deviation angles between the extension direction of the A-type inclusions and the center axis weighted by the length of each of the A-type inclusions is equal to or greater than 20 degrees at least in a region just below the disk mounting surface in a cross section of the disk mounting portion taken along a plane including the center axis.

9. The rotor hub of claim 6, wherein the average value weighted is equal to or greater than 45 degrees.

10. The rotor hub of claim 7, wherein the average value weighted is equal to or greater than 45 degrees.

11. The rotor hub of claim 8, wherein the average value weighted is equal to or greater than 45 degrees.

12. A spindle motor comprising:
a bearing mechanism;
the rotor hub of claim 9 supported by the bearing mechanism for rotation about the center axis;
a rotor magnet fixed to the rotor hub; and
a stator arranged in a spaced-apart relationship with the rotor magnet.

13. A hard disk drive comprising:
the spindle motor of claim 12;
a hard disk mounted on the rotor hub of the spindle motor; and
a magnetic head for recording and/or reproducing information on and/or from the hard disk.

14. A method for manufacturing a rotor hub which is used in a hard disk drive spindle motor, the method comprising:
a raw material preparation step for preparing a bar of free-cutting stainless steel;
a slug preparation step for cutting the bar into a specified length to obtain a slug;
a plastic working step for subjecting the slug to a plastic working to form a disk mounting portion and a cylindrical surface positioned radially inwardly of the disk mounting portion; and
a disk mounting surface forming step for machining substantially the entirety of an annular surface of the disk mounting portion into a disk mounting surface; wherein
the plastic working step comprises a top panel portion forming step for forming a top panel portion extending away from a center axis of the disk mounting portion, the top panel portion being subjected to upsetting in the plastic working step; and
the rotor hub is a single seamless part made of free-cutting stainless steel and contains A-type inclusions appearing in a cross section taken along the center axis, the A-type inclusions being oriented to extend in directions different than the center axis, the orientation of the A-type inclusions on one radially opposite side of the cross section being opposite or substantially opposite from the orientation of the A-type inclusions on another radially opposite side of the cross section.

15. The rotor hub manufacturing method of claim 14, wherein an axial end surface of the top panel portion being subjected to machining substantially in its entirety, the upsetting being performed at an upsetting percentage of 70% or less in the entire region of the top panel portion and at an upsetting percentage of 30% or more at least in a partial region of the top panel portion.

16. The rotor hub manufacturing method of claim 14, wherein the bar of free-cutting stainless steel contains at least one A-type inclusion having a length of 100 μm or more distributed over an area of unit square millimeter on a longitudinal cross section of the bar.

17. The rotor hub manufacturing method of claim 14, further comprising an annealing step for heating and annealing the disk mounting portion at a temperature higher than a recrystallization temperature, prior to performing the disk mounting surface forming step.

18. The rotor hub manufacturing method of claim 17, wherein the free-cutting stainless steel comprises ferritic free-cutting stainless steel and wherein the heating temperature in the annealing step is in a range of from 700° C. to 830° C.

19. The rotor hub manufacturing method of claim 14, further comprising a disk fitting surface forming step for machining substantially the entirety of the cylindrical surface into a disk fitting surface.

20. The rotor hub manufacturing method of claim 16, further comprising a disk fitting surface forming step for machining substantially the entirety of the cylindrical surface into a disk fitting surface.

21. The rotor hub manufacturing method of claim 17, further comprising a disk fitting surface forming step for machining substantially the entirety of the cylindrical surface into a disk fitting surface.

22. The rotor hub manufacturing method of claim 18, further comprising a disk fitting surface forming step for machining substantially the entirety of the cylindrical surface into a disk fitting surface.

* * * * *